US010203846B1

(12) United States Patent
Geng et al.

(10) Patent No.: US 10,203,846 B1
(45) Date of Patent: Feb. 12, 2019

(54) SYSTEM AND METHOD FOR NON-DETERMINISTICALLY PROVIDING DENOMINATED VIRTUAL CURRENCIES IN A VIRTUAL SPACE

(71) Applicant: ELECTRONIC ARTS INC., Redwood City, CA (US)

(72) Inventors: Weiwei Geng, Beijing (CN); Matthew Curtis, Novato, CA (US); Michael C. Caldarone, Palo Alto, CA (US); Stephanie K. Schultz, San Francisco, CA (US); Kellen Christopher Smalley, Pleasanton, CA (US); Xuezheng Liu, Beijing (CN)

(73) Assignee: ELECTRONIC ARTS INC., Redwood City, CA (US)

( * ) Notice: Subject to any disclaimer, the term of this patent is extended or adjusted under 35 U.S.C. 154(b) by 1252 days.

(21) Appl. No.: 13/895,573

(22) Filed: May 16, 2013

(51) Int. Cl.
 G06F 3/0484 (2013.01)
 G06Q 30/02 (2012.01)

(52) U.S. Cl.
 CPC ....... G06F 3/0484 (2013.01); G06Q 30/0209 (2013.01)

(58) Field of Classification Search
 CPC .. G07F 17/32; G07F 17/3225; G07F 17/3244; G07F 17/3239; G07F 17/3267; G07F 17/3262; G06Q 30/0209; G06Q 50/01; G06Q 30/0241; G06Q 30/0277; G06Q 30/00; G06Q 10/06311; G06Q 10/087; G06Q 10/10; G06Q 30/02; G06Q 30/0207; G06Q 30/0269; G06Q 30/0601; G06Q 30/0641; G06Q 30/0643

USPC .......................................................... 705/14
See application file for complete search history.

(56) References Cited

U.S. PATENT DOCUMENTS

| 8,137,193 B1 | 3/2012 | Kelly et al. ..................... 463/31 |
| 2011/0264489 A1 | 10/2011 | Ganetakos et al. ............. 705/12 |
| 2012/0047002 A1* | 2/2012 | Patel .................. G06Q 30/0207 |
| | | 705/14.1 |

(Continued)

OTHER PUBLICATIONS

Currency—WoWWiki—Your guide to the World of Warcraft, http://www.wowwiki.com/Currency, printed Feb. 14, 2013, 3 pages.

(Continued)

Primary Examiner — Rutao Wu
Assistant Examiner — Alfred H Tsui
(74) Attorney, Agent, or Firm — Knobbe, Martens, Olson & Bear, LLP

(57) ABSTRACT

A system and method for non-deterministically providing denominated virtual currency in a virtual space are disclosed. The units of virtual currencies may be classified by different denominations and levels. Non-purchasing utilities may be obtained for the denomination and level of the virtual currencies and provided to users in the virtual space. In one example, the denomination and level of the virtual currencies may be used as socketing elements to provide boosts to base attributes to virtual items. In some implementations, an amount of boost provided by a denomination and level of virtual currency when socketed to a virtual item may be determined based on numerical relationships among the denomination and level of the virtual currencies. The denomination and level of virtual currencies may be harvested non-deterministically by users based on probabilities determined for the users.

19 Claims, 4 Drawing Sheets

(56) References Cited

U.S. PATENT DOCUMENTS

| | | | | |
|---|---|---|---|---|
| 2012/0077580 A1* | 3/2012 | Mahajan | ................ | A63F 13/60 |
| | | | | 463/29 |
| 2012/0157210 A1* | 6/2012 | Hall | ...................... | A63F 13/79 |
| | | | | 463/40 |
| 2013/0035991 A1* | 2/2013 | Romero | ............. | G06Q 30/0224 |
| | | | | 705/14.1 |
| 2014/0087822 A1* | 3/2014 | Watkins | ................ | G07F 17/326 |
| | | | | 463/20 |

OTHER PUBLICATIONS

Gem System—Dragon Oath (DO) Gamezone—MMOSite, http://do.mmosite.com/content/gem.shtml, printed Feb. 14, 2013, 10 pages.
Gem-WoWWiki—Your guide to the World of Warcraft, http://www.wowwiki.com/Gem, printed Feb. 14, 2013, 2 pages.

* cited by examiner

SYSTEM AND METHOD FOR NON-DETERMINISTICALLY PROVIDING DENOMINATED VIRTUAL CURRENCIES IN A VIRTUAL SPACE

FIELD OF THE DISCLOSURE

This disclosure relates to providing virtual currencies having different denominations and levels in a virtual space, the virtual currencies being non-deterministically provided to users through harvesting and having utilities other than for purchasing virtual items in the virtual space.

BACKGROUND

Virtual space systems that provide currencies as exchange medium in the virtual space are known. In those virtual systems, one or more types of currencies, e.g., such as gold, coins, or tokens are typically deemed with fiat values for purchasing virtual items. For example, in those virtual systems, 100 coins may be used to purchase a crafted sword sold in an auction house of the virtual space as determined by a seller user of the crafted sword. In those systems, the virtual currencies are typically provided to users through monsters, quests, missions, loyalty rewards and mining activities. For example, an amount of coins may be dropped by a monster after the user has killed the monster in a quest; an amount of gold may be provided to the user after the user has mined a gold mine for a period of time in the virtual space; and an amount of coins may be provided to the user at the beginning of every play session of a user for rewarding the user's loyalty with the virtual space. In those systems, the virtual currencies typically do not have intrinsic utilities within the virtual space such that they may not be used substantively within the virtual space other than for purchasing virtual items.

SUMMARY

One aspect of the disclosure relates to non-deterministically providing virtual currencies of different denominations and levels to users in the virtual space. For currencies circulated in the virtual space, denominations may be established based on types or kinds of a virtual currency class. In one example, different types of gems may be used in the virtual space as denominations of the currencies, e.g., Ruby, Safire, Emerald, Topaz and so on. Within individual denominations of the virtual currencies, different levels may be established, e.g., level 1, 2, 3, 4, and 5 Ruby, level 1, 2, 3, 4, and 5 Emerald, and so on. Such denomination and level of virtual currencies may provide utilities other than for purchasing virtual items in the virtual space. Such non-purchasing utilities provided by the denomination and level of virtual currencies may correspond to, for example but not limited to, crafting, socketing, attacking, defending, mining, building and/or any other utilities to facilitate user actions and/or activities within the virtual space. In some implementations, the utilities of denomination and level of virtual currencies may be determined based on numerical relationships among the denomination and level of virtual currencies.

The denomination and level of virtual currencies may be provided to users through harvesting within the virtual space. A probability of harvesting denomination and level of virtual currencies may be determined such that non-deterministic harvesting outcomes may be generated in response to the user harvesting action for the denomination and level of virtual currencies. The harvested denomination and level of virtual currencies may be distributed to user inventories based on such probabilities. This may enhance virtual space balance by providing virtual currencies back-stopped by some substantive uses in the virtual space at controlled provisioning rates. This may enhance user experience and/or enjoyment with the virtual space by non-deterministically providing users virtual currencies that may be used for different purposes within the virtual space.

In some implementations, a system configured to non-deterministically provide denominated virtual currencies in a virtual space may include a server. The server may operate in a client/server architecture with one or more client computing platforms. The client computing platforms may be associated with the users of the virtual space. The server may be configured to execute one or more of a space module, a user module, a currency module, a socketing module, a probability module, a harvesting module, a distribution module, and/or other modules.

The space module may be configured to execute an instance of a virtual space. The space module may implement the instance of the virtual space such that units of virtual currencies are harvested by users in the virtual space. Within the virtual space, of virtual space values may be stored and/or exchanged. To facilitate the virtual space value storage and/or exchange, units of the virtual currencies may provide measures of virtual space values as determined by a provider, administrator, moderator, user, and/or any other entities related to the virtual space. The virtual currencies may be consumed to facilitate virtual space actions and/or activities, purchases of virtual items sold by the provider of the virtual space, transactions between users, and/or for any other purposes within the virtual space. For one or more currencies circulated in the virtual space, denomination systems may be established to classify units of currencies and numerical relationships may be established between or among denominated currencies. Within individual denominations of the currencies, levels may be established to further distinguish a denomination of currency, for example, level 1, 2, 3, 4, or 5 Ruby, and 1, 2, 3, 4, or 5 Emerald, level 1, 2, or 3 tea leaves, level 1, 2 or 3 lotus roots, and so on. Virtual currencies may be harvested by users from source cores within the virtual space. A source core is a type of virtual space object or location that may provide currencies, raw materials, resources, substances, and/or any other virtual space elements when harvesting actions are performed by user characters with proper skills, equipment, gears, formulas, time duration, and/or any other harvesting parameters. Examples of source cores may include mines, rivers, wells, oceans, swamp, mountains, forests, boxes, caves, troves, pets, plants, NPCs, and/or any other virtual space objects or locations.

The user module may be configured to manage user accounts associated with individual users. The user accounts may include user information related to the individual users, which may comprise virtual space information related to the individual users. The user accounts may include a first user account with a first user and the first user account may include information indicating an inventory of the first user.

The currency module may be configured to obtain numerical relationships among the denominations and levels of the virtual currencies and to obtain utilities for the denomination and level of virtual currencies. The obtained numerical relationships may be specified by the provider, administrator, moderator, and/or any other entities related to the virtual space to facilitate conversions among units of the virtual currencies as classified by the denominations and levels of the virtual currencies. The obtained utilities for the denomination and level of virtual currencies may include one or more utilities in the virtual space other than for purchasing virtual items. Examples of such utilities may correspond to, without limitations, crafting, socketing, fighting, defending, learning, exploring, maneuvering, mounting, and/or any other virtual space activities or actions. In one example, the provider, administrator, moderator, and/or any other entities related to the virtual space may specify that the denomination and level of gems may be used as currencies in the virtual space and may be used as socketing elements to boost attributes of virtual items when the gems are socketed to the virtual items.

The socketing module may be configured to determine an amount of boost to base attributes of virtual items provided by the denomination and level of virtual currencies when socketed on the virtual items. The socketing module may determine such a boost in response to socketing actions committed by the users in accordance with one or more socketing parameters. The socketing parameters may include, without limitations, the denominations and levels of the virtual currencies being socketed to the virtual items, user skills, socketing equipment, success rate, attributes of the socketed virtual items, and/or any other socketing parameters. In some implementations, such determinations may be made by the socketing module based on the numerical relationships among the denominations and levels of the virtual currencies as obtained by the currency module. For example, in a case where numerical relationships obtained by the currency module specify 10 level one Rubies=5 level two Rubies=3.3 levels 3 Rubies=2.5 level four Rubies=2 level 5 Rubies, an amount of boost provided by a corresponding denomination and level of Ruby socketed on virtual items may be determined based on such numerical relationships.

The probability module may be configured to obtain probabilities for harvesting denomination and level of virtual currencies in the virtual space. The obtained harvesting probabilities may be specified by the provider, administrator, moderator, and/or any other entities related to the virtual space, for example, for a source core to output denomination and level of virtual currencies in response to harvesting actions by the users at the source core. The obtained probabilities may be used, for example by the harvesting module, for determinations of outputs to the user from the source core. In some implementations, the probability module may be configured to determine probabilities by which denomination and level of virtual currencies may be harvested from a given source core. For facilitating such determinations, the probability module may be configured to employ the numerical relationships among the denominations and levels of the virtual currencies that may be harvested from the source core. In some implementations, the probability module may be configured to determine the harvesting probability further based on other parameters such as the user skill, equipment used for the harvesting action, a number of user characters employed to harvest, a length of time duration committed for the harvesting action, and/or any other parameters.

Harvesting module may be configured to determine denomination and level of virtual currencies to be harvested by users in response to user harvesting actions. Such determinations may be made by the harvesting module by generating one or more of a non-deterministic outcome for the user harvesting actions in accordance with the harvesting probabilities determined by the probability module. For generating such a non-deterministic outcome, the harvesting module, in some examples, may determine an output rate quantified by an amount of outputs over unit time for a source core: e.g., two gems of a variety of different levels of Ruby and Emerald every second, three gems a variety of different levels of Ruby, Emerald and Safire every 3 seconds, and so on. In that example, a non-deterministic outcome for individual units of the output may be generated by the harvesting module by randomizing the output based on the probabilities determined by the probability module: e.g., one level 1 Ruby and one level 2 Emerald in the first second, one level 3 Ruby and one level 1 Ruby in the $2^{nd}$ second, two level 1 Rubies in the $3^{rd}$ second and so on.

The distribution module may be configured to distribute virtual currencies to user inventories in response to the denomination and level of virtual currencies determined by the harvesting module. For such distributions, the distribution module may be configured to distribute the virtual currencies harvested by the users to the user inventories at a rate predetermined by the provider, administrator, moderator, and/or any other entities related to the virtual space.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
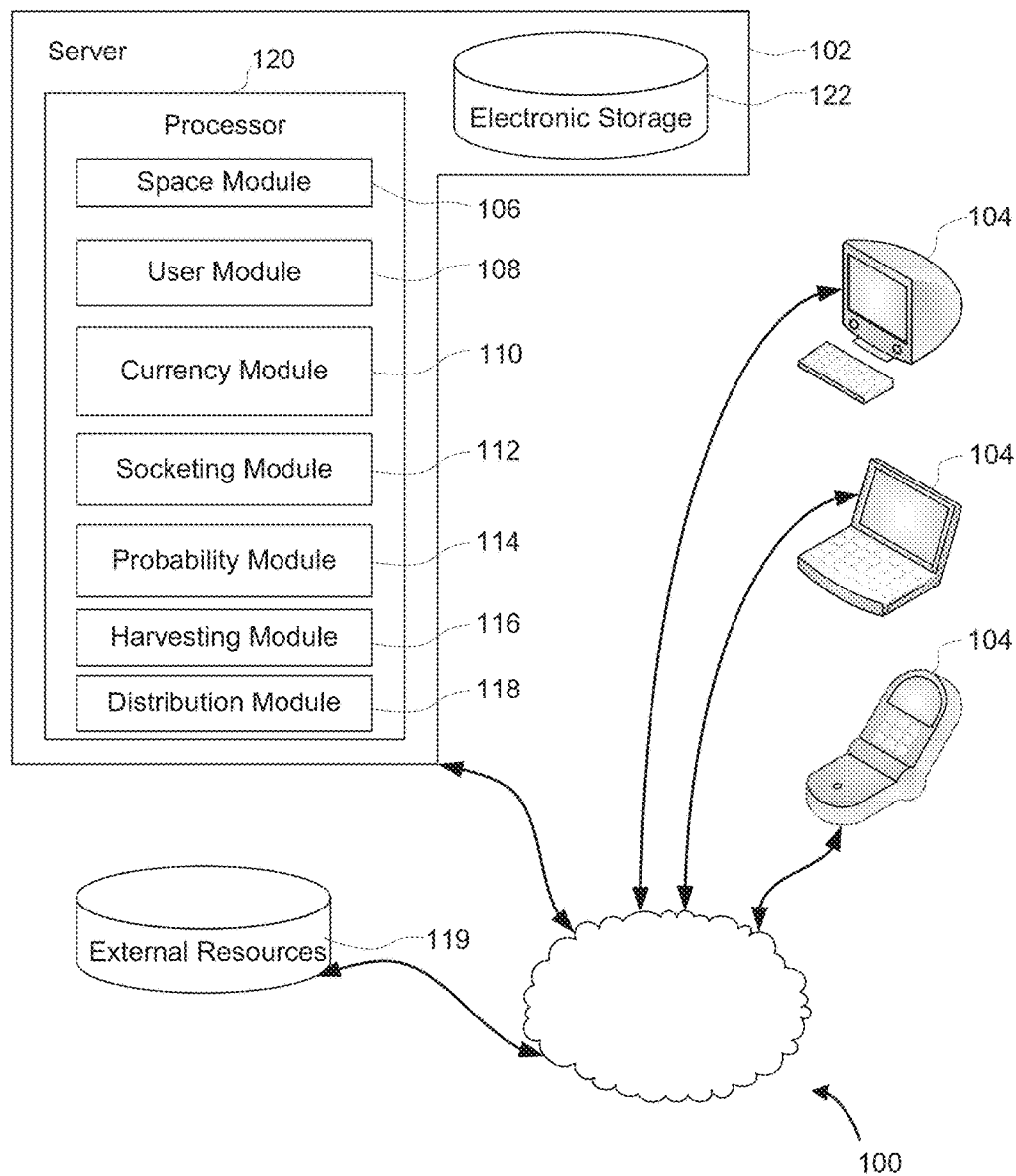
FIG. 1 illustrates one example of a system configured to non-deterministically provide denominated virtual currencies in a virtual space.

FIG. 1 illustrates one example of a system configured to non-deterministically provide denominated virtual currencies in a virtual space. The virtual currencies may have units classified by different denominations and levels. Numerical relationships among the different denominations and levels of the virtual currencies may be established. One or more utilities other than for purchasing virtual items may be obtained for the denomination and level of the virtual currencies, for example, without limitations, as socketing elements for enhancing virtual items and/or any other utilities. In some implementations, an amount of boost to base attributes of the virtual item provided by the socketed denomination and level of the virtual currencies may be determined based on the numerical relationships among the denominations and levels of the virtual currencies. The denomination and level of virtual currencies may be harvested by users from source cores within the virtual space. Probabilities for users to harvest specific denomination and level of the virtual currencies through harvesting actions may be determined. The denomination and level of the virtual currencies may be harvested non-deterministically from the source cores in accordance with such harvesting probabilities and distributed to user inventories. Such non-deterministic provisioning of virtual currencies having different denominations and levels and substantive utilities other than for purchasing virtual items may improve user experience and/or enjoyment in the virtual space.

In some implementations, system 100 may include a server 102. The server 102 may be configured to communicate with one or more client computing platforms 104 according to a client/server architecture. The users may access system 100 and/or the virtual space via client computing platforms 104. Server 102 may be configured to execute one or more computer program modules. The one or more computer program modules may include one or more of a space module 106, a user 108, a currency module 110, a socketing module 112, a probability module 114, a harvesting module 116, a distribution module 118 and/or other modules.

Space module 106 may be configured to implement the instance of the virtual space executed by the computer modules. The instance of the virtual space may reflect the state of the virtual space. The instance of the virtual space may be used to push state information to clients for implementation on the clients, may be used to verify state information generated on clients executing expressions of the instance locally, and/or for other purposes. State information may include information about the state of the virtual space such as, without limitation, position information of one or more objects, topography information, object status/shape information, battle information, score information, user or character progress information, user inventory information, progress information for one or more activities or actions, view information describing a view of the virtual space, and/or other information that describes the state of the virtual space. Expressions of the instance executed on the clients facilitate presentation of views on the clients of the virtual space. Expressions of the instance executed on the clients may be configured to simply present views of the virtual space based on the state information (e.g., via streaming view information, object/position information, and/or other state information) received from space module 106. Expressions of the instance executed on the clients may include space logic that effectively provides for execution of a limited version of the instance on a client that is synchronized and/or verified with state information received from space module 106. The view presented on a given client may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 104) that present the views of the virtual space to a user through a space interface implemented on client computing platform associated with the user. The space interface may be generated based on view information determined by the space module 106. The space interface may provide one or more virtual space controls to facilitate user actions in the virtual space by the user. The facilitated actions may include user engagement in a combat and/or defense, virtual space maneuvers, inventory management, city management, construction of infrastructure, mining activities, virtual recourses and/or items trading or purchasing, transferring virtual resources, items and/or entities, picking up virtual space resources, and/or any other actions in the virtual space.

In any case, the simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the views of the virtual space determined from the instance executed by space module 106 is not intended to be limiting. The virtual space may be presented in a more limited, or richer, manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the virtual space are contemplated.

Within the instance of the virtual space executed by space module 106, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user, with which it is associated. The user controlled element(s) may move through and interact with the virtual space (e.g., non-user characters in the virtual space, other objects in the virtual space). The user may initiate maneuvers to direct the movements of controlled character in the virtual space. The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The user may participate in the instance of the virtual space by taking actions in the virtual space. In some implementations, the user actions may be enabled by physical controls provided by the client computing platforms 104 through, such as but not limited to, play buttons, joysticks, motion sensors, cameras, keyboards, mouse, and/or any other control device provided by or coupled to client computing platforms 104. In some implementations, the actions may be enabled by controls provided by graphical user interface (GUI) implemented on client computing platforms 104, such as but not limited to, graphics, menus, dialog boxes, forms, sliding bars, buttons, radio box, tabs, and/or any other controls provided by the GUI. In any case, as so enabled, the user may provide inputs to direct virtual space maneuvers, to participate in virtual activities and/or engage in other interactions within the virtual space. For example, a user may provide an input specifying an amount of troops to be marched to a virtual space location to defend that virtual space location. Commands may be generated for the user action and may be executed by the space module 106 in the virtual space such that the user interactions with the virtual space may be effectuated in the virtual space following the execution. Execution of such a command by the space module 106 may produce changes to the virtual space state, which may reflect progresses and/or results of the user initiated actions. In some examples, state changes caused by user actions may be recorded in the electronic storage 122 to facilitate persistency throughout the instance of the virtual space.

Within the instance of the virtual space executed by space module 106, resources may be, for example, generated, cultivated, mined, harvested, purchased, earned, traded and/or gifted over time by units, characters, pets, buildings, facilities and/or any other infrastructure or entity in the virtual space for the user. Resources may be prospected. Resources may be virtual items of value that can be accumulated through participation in the virtual space, rather than virtual items that can only be bought or virtual currencies that may be used to facilitate store and exchange of values in the virtual space. Resources may be virtual items that are accumulated en masse and then used to satisfy resource requirements in the virtual space. By way of non-limiting examples, virtual space resources may include food (e.g., rice, fish, wheat, etc.), wood, minerals (e.g., good, iron, ore, coal, oil, stone, crystal, etc.), plants, animals, virtual items, virtual currencies, and/or any other resources appropriate for the virtual space. Transfer of resources between users may be reflected through user inventories such that the transferor user's inventory reduces an amount of the transferred resources that are added to the transferee user.

Within the instance of the virtual space executed by space module 106, virtual space activities may be provided for users to interact with the virtual space by the provider, administrator, moderator, and/or any other entities related to the virtual space. The virtual space activities may be provided by the provider, administrator, moderator, and/or any other entities related to the virtual space to present opportunities and/or motivations for users to progress in the virtual space. Typically, user may be facilitated, e.g., through space interfaces, to provide inputs to initiate and/or participate in the virtual space activities. One or more activity parameters may be specified, e.g., by the provider, administrator, moderator, and/or any other entities related to the virtual space for the execution of the virtual space activities. During and/or at the end of the virtual space activities, user progression in the virtual space, such as improvements in user character experience levels, skills, strength, infrastructure, virtual items, virtual space entities in control by the user and/or other improvement in virtual space aspects related to the user typically may result in the virtual space. Typically, such user progression in the virtual space may be reflected through state changes in the virtual space and recorded in virtual space one or more database (e.g., user profile, avatar, game, and/or any other virtual space database).

Some virtual space activities may require consumption of virtual resources. During a virtual space activity, an amount of the resources may be increased or decreased in the user inventory for the activity to reflect consumption (including exhaustion) or procurement of the resources due to the virtual space activity. Some virtual space activities may be associated with an amount of time duration for completion. Length of such time duration may vary based on various factors specific to the virtual space activities. For example, constructing a level 1 wall in the virtual space may require 30 minutes build time; constructing a level 2 wall may require 1 hour build time; constructing a level 3 wall may require 2 hour build time; constructing a level 4 wall may require 3 hour build time; and so on. The required time duration for an activity may be shortened by user consumption of virtual currencies, items and/or resources. For example, hourglasses may be consumed by users to shorten time duration for a building, training, research and/or any other activities within the virtual space.

Examples of virtual space activities may include crafting virtual items, harvesting virtual space elements, constructing, upgrading, and/or demolishing buildings, training, marching, reinforcing, reassigning, recruiting, arranging formations, and/or transporting troops, attacking, developing, managing, demolishing and/or defending cities, realms, kingdoms, and/or any other virtual space locations, researching for skills levels, experiences, mining and/or prospecting for virtual resources, participating in missions, quests, and/or campaigns, and/or any other activities provided by the virtual space. Some virtual space activities may engage the users against an environment within the virtual space—i.e., PvE activities. In some examples, the virtual space activities may engage the users to compete against one another within the virtual space—i.e., PvP activities. Such virtual space activities typically provide opportunities and/or motivations for users to progress in the virtual space.

Within the instance of the virtual space, crafting activities may be provided in the virtual space for users to combine, transform, or transmute virtual resources to produce correspond virtual items such as but not limited to, armor, weapon, potion, wardrobe, books, and/or any other virtual items. The virtual items may be crafted for the crating users' own use in the virtual space and/or may be traded or sold in the virtual space to other users. A crafting activity may be initiated by a user in the virtual space by providing inputs. Following the user initiation of the crafting activity, the crafting activity may be executed in the virtual space in accordance with crafting activity parameters to reflect a corresponding crafting process within the virtual space.

Within instance of virtual space, harvesting activities may be provided for users to collect raw material, resources, currencies, substances, and/or any other virtual space elements from source cores within the virtual space. To facilitate harvesting activities, harvesting actions may be provided to enable user characters to collect an amount of raw material, resources, currencies, substances, and/or any other virtual space elements from the source cores. Harvesting probabilities may be established for particular harvesting actions by the users based on the elements being harvested, user skills, elements harvested, harvesting equipment, time duration, harvesting location, topology and virtual space objects surrounding the harvesting locations, and/or any other harvesting parameters. The determined harvesting probabilities may facilitate determining outcome of user harvesting actions.

A source core is a type of virtual space object that may provide specific raw materials, resources, currencies, substances, and/or any other virtual space elements when harvesting actions are performed by user characters with proper skills, equipment, gears, formulas, time duration, and/or any other harvesting parameters. Source cores may or may not be visible to the users, depending on the user skills. Source cores may be depleted due to harvesting actions by users and in some examples may be destroyed in the virtual space. In some examples new source cores may be created to replace the destroyed ones in the virtual space at times determined by the provider, administrator, moderator, and/or any other entities related to the virtual space. Examples of source cores may include mines, rivers, wells, oceans, swamp, mountains, forests, boxes, pets, plants, NPCs, and/or any other virtual space locations or objects.

Within the virtual space, socketing activities may be provided in the virtual space for users to enhance virtual items. Virtual space elements, such as gems, jewelry, rings, fragments, tokens and/or any other suitable virtual space elements may be socketed to available slots on certain virtual items. The socketed virtual space elements may improve various attributes of the socketed item. For example, a gem socketed to a sword may improve the sword's heaving efficiency, accuracy, attack strength, power, and/or any other attributes associated with the sword. In some examples, the improvements by the socketed items may be quantified by an amount of boosts to the various base attributes of the socketed elements: for example, a 10% attack strength boost to the base attack strength of a sword may be provided by a socketed element such that the sword may cause 110% of its base damage points to the target, a 20% heaving efficiency boost to the base heaving efficiency, a 30% accuracy boost to the base accuracy, and so on.

Within the instance of the virtual space, virtual currencies may be provided to facilitate store and/or exchange of virtual space values. Units of the virtual currencies (for example, a gold, a gem, a silver, a coin, a token, and so on) may provide measures of virtual space values as determined by a provider, administrator, moderator, user, and/or any other entities related to the virtual space. Through one or more units of virtual currencies, virtual space values may be captured, stored, and circulated in the virtual space. As one non-limiting example, actions, skills, items and time combination expanded by a user, i.e., labor within the virtual space, may be captured, stored and circulated through virtual currencies to reflect the virtual space values created by the user labor. For instance, a user may be provided 1000 gold after performing certain harvesting actions in the virtual space for a period of time with certain required harvesting equipment operable only by a skilled professional which the user has expanded labor to assume.

Within the virtual space, virtual currencies may be consumed to facilitate virtual space actions and/or activities, purchases of virtual items, transactions between users, and/or for any other purposes within the virtual space. In some examples, the virtual currency consumption may be required to fund actions and/or activities engaged in by a user. For example, a quest may impose 100 coins entrance fee per user to cover the cost incurred for the provider of the virtual space to provide the quest (e.g., server space, programming efforts, marketing expenses, administration cost, record keeping cost and/or any other costs incurred by the virtual space provider). In some examples, the virtual currency consumption may facilitate purchase of virtual items and/or transactions between the users. By way of non-limiting examples, prices may be determined in units of the currencies for virtual items sold in a virtual store operated by provider, administrator, moderator, and/or any other entities related to the virtual space; and prices may be determined in units of the virtual currencies for virtual items sold in an auction house operated by the users of the virtual space.

In some examples, resources or virtual items may be used for exchanging other resources or virtual items in the virtual space, and in that sense they may be used as exchange medium in the virtual space. For example, a seller user may ask for a particular virtual item or an amount of certain virtual resources in exchange for a virtual item the seller user is selling in an auction house. However, unlike virtual currencies, such resources and virtual items may not be intended as currencies in the virtual space by the provider, administrator, moderator, and/or any other entities related to the virtual space, as they may not provide measure of values and store values throughout the instance of the virtual space.

In any case, virtual currencies may be provided through however virtual space substances or elements in the virtual space as desired by the provider, administrator, moderator, and/or any other entities related to the virtual space. For one or more currencies circulated in the virtual space, denomination systems may be established to classify units of currencies and numerical relationships may be established among individual denominations of the currencies. By way of non-limiting examples, different types of a class of virtual space substances and/or elements, such as, gem, shell, stone, gold, plants, archeological fragments, and/or any other virtual space substances or elements may be used to establish such a currency denomination system. For instance, different types of herbs may be used as denominations of currencies in the virtual space, such as, without limitations, tea leaves, lotus roots, tree roots, ginseng, lily flower petal, and so on. Within individual denominations of such currencies, levels may be established to distinguish the denominations of the currencies, for example, level 1, 2, 3, 4, or 5 tea leaves, lotus roots, tree roots, ginseng, lily flower petal and so on. It is understood that levels of a currency denomination may be provided or established in the virtual space in however ways as desired by the provider, administrator, moderator, and/or any other entities related to the virtual space, and not necessarily limited to numerical classifications. For example, within tree leaves, different grades may be provided in the virtual space and used as levels of the tree leaves, such as, without limitations, fair, good, premium, rare and so on.

The user module 108 may be configured to manage user accounts associated with individual users of the system 100. Information related to users, i.e. user information may be stored in user accounts. The user accounts may be stored within server 102, one or more of the client platforms 104, and/or other storage locations. Examples of user information stored in user accounts may include, for example, information identifying users (e.g., a username or handle, a number, an identifier, and/or other identifying information) within the virtual space, a client computing platform 104 identification associated with a user, user inventory in virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a phone number associated with a user, and/or other information related to users. It should be understood that the above examples of user information in a virtual space are described for illustration purposes only and thus are not intended to limiting. The user information stored in user account managed by the user module 108 may include any information related to a user in the virtual space.

Information indicating user inventory in the virtual space, as managed by the user module 108, may include information indicating an amount of resources, troops, user characters, currencies, virtual items, substances, and/or any other virtual space elements possessed by the user in the instance of the virtual space. Currencies that have been acquired, e.g., harvested by a user may be distributed to the user inventory by adding the amount of the acquired currency to a total amount of the currencies possessed by the user; and currencies consumed by the user in the virtual space may be deducted from the total amount of currencies in the user inventory.

The currency module 110 may be configured to obtain numerical relationships among the denominations and levels of the virtual currencies. Such numerical relationships may be specified by the provider, administrator, moderator, and/or any other entities related to the virtual space to facilitate conversions among units of the virtual currencies as classified by the denominations and levels of the virtual currencies. For example, numerical relationships may be established for different denominations of virtual currencies, e.g., such as gems, herbs, woods, plants, ores, stones and/or any other virtual currencies. In one example, different type of gems may be used as denominations of currencies in the virtual space and numerical relationships may be specified between different types of gems, e.g., one Ruby=two Safire=three Emerald=four Topaz and so on. Within individual denominations of the virtual currencies, numerical relationships among different levels may be established similarly. For example, 10 level one Rubies=5 level two Rubies=3.3 levels 3 Rubies=2.5 level four Rubies=2 level 5 Rubies, and so on. It is understood that the numerical relationships among denominations and/or levels of virtual currencies may be established by the provider of the virtual space in however numerical ways as desired and the numeric relationships among levels of different denominations of virtual currencies may not necessarily be the same. For instance, unlike the numerical relationships established for the levels of Rubies in the example above, numerical relationships may be established differently for different levels of an Emerald: e.g., 20 level one Emeralds=4 level two Emeralds=2 level three Emeralds=one level four Emerald and so on. Such numerical relationships among the levels and the denominations of virtual currencies, in some examples, may facilitate conversions among different denomination and level of the virtual currencies. For instance, in the examples above, one level four Emerald may be converted to 3 level two Rubies.

The currency module 110 may be configured to obtain utilities for denominations and levels of the virtual currencies. A denomination and level of virtual currency may be configured to provide one or more utilities in the virtual space other than for purchasing virtual items. The denomination and level of virtual currencies when used according to such utilities may cause effects in the virtual, such as improving one or more attributes associated with a virtual item, causing damages to virtual space objects and characters, improving defense strength of a virtual space location, character, object and/or troops, facilitating virtual space processes, activities and/or actions, and/or any other effects in the virtual space. Some examples of utilities provided by a denomination and level of virtual currency may correspond to crafting, socketing, fighting, defending, learning, exploring, maneuvering, mounting, and/or any other virtual space activities or actions.

The utilities of the virtual currencies may be configured by the provider, administrator, moderator, and/or any other entities related to the virtual space at a configuration stage of the system 100, for example, through specifying the utilities in a configuration file stored on the electronic storage 122. For instance, the provider of the virtual space may specify that different denomination and level of the gems may have utilities for socketing, crafting and/or any utilities other than for purchasing virtual items in the virtual space. In some examples, the currency module 110 may be configured to determine the non-purchasing utilities of the virtual currencies dynamically during runtime of the system 100. For example, new utilities may be determined for the denominations and levels of virtual currencies as new virtual items appear in the virtual space, for example, as created by the provider and/or users of the virtual space.

By way of a non-limiting example, a denomination and level of virtual currency may be used to socket a virtual item to improve base attributes associated with the virtual item. For certain virtual items, such as, without any limitation, swords, armor, blades, spears, axes, guns, and/or any other suitable virtual items, slots may be provided on the virtual items such that one or more virtual elements may be socket to the virtual items. A denomination and the level of virtual currency may be configured to have socketing utilities such that it may be placed onto the slots of a virtual item to enhance the virtual item. Such socketing utility provided by the denomination and level of the virtual currencies may include bonuses, improvements, enhancements, and/or any other type of boosts to the base attributes of the virtual items. By way of non-limiting examples, a level 1 Ruby may be socketed to a sword to provide a 10 point boost to the 100 point base damage points of the sword such that when the sword is accurately trusted to a target 110, instead of 100, points of damage will incur to that target (e.g., the health of the target may be reduced by 100 points). In some examples, the amount of boost provided by the socketed virtual currency may be quantified as percentage increase to one or more attributes associated with the socketed virtual item. For example, the level 1 Ruby may be configured to provide 10% boost to the sword base damage points such that the sword with the socketed level 1 Ruby will cause 110% of its base damage to a target (e.g., if the sword has 100 point base damage points, the sword will have currency module 110 point base damage points when the level 1 Ruby is socketed to the sword; if the sword has 200 point base damage points, the sword will have 220 point base damage points when the level 1 Ruby is socketed to the sword; and so on).

The socketing module 112 may be configured to determine an amount of boost to base attributes of virtual items provided by virtual currencies socketed on the virtual items. A denomination level of virtual currency, such as a level 1, 2, 3, 4 or 5 Ruby, may be socketed to a virtual item to improve the virtual item's base attribute, such as power, efficiency, accuracy, damage, weight, speed, and/or any other attributes associated with the virtual item. Such improvement provided by the socketed virtual currencies may be quantified by an amount of boost in terms of point increase, percentage increase and/or any other form of increase to the base attributes of the socketed virtual item.

The socketing module 112 may determine an amount of boost in response to socketing actions committed by the users in accordance with one or more socketing parameters. The socketing parameters may include, without limitation, the elements being socketed the virtual items including denominations and levels of virtual currencies, user skills, socketing equipment, success rate, attributes of the socketed virtual items, and/or any other socketing parameters. For instance, the socketing module 112 may determine that a level one Ruby may provide a 10% of power boost to the base power of a particular kind of sword, a level two Ruby may provide 20% power boost to base power of the sword, a level three Ruby may provide 30% of the power boost to base power of the sword so on.

In some implementations, such determinations may be made by the socketing module 112 based on the numerical relationships among the denominations and levels of the virtual currencies. For example, in the case where numerical relationships obtained by the currency module 110 specify 10 level one Rubies=5 level two Rubies=3.3 levels 3 Rubies=2.5 level four Rubies=2 level 5 Rubies, an amount of boost provided by a corresponding denomination level of Ruby socketed on virtual items may be determined based on such numerical relationships. For instance, the socketing module 112 may determine that a level one Ruby may provide a 10 point defense boost to the base defense points of armor when the level one Ruby is socketed to the armor; a level two Ruby may provide 20 point boost to the base defense points of the armor when socketed; a level 3 Ruby may provide 33 point boost to the base defense points of the armor when socketed; a level 4 Ruby may provide 40 point boost to the base defense points of the armor; a level 4 Ruby may provide 50 points by a level five Ruby to the base defense points of the armor; and so on.

Probability module 114 may be configured to obtain probabilities for harvesting denomination and level of virtual currencies in the virtual space. The obtained harvesting probabilities may be specified by the provider, administrator, moderator, and/or any other entities related to the virtual space, for example, for a source core to provide the denomination and level of virtual currencies in response to harvesting action by the users at the source core. The obtained harvesting probabilities may be used, for example by the harvesting module 116, for determination of outputs to the user from the source core. For example, for a chest box that provides 100 gems having varieties of Rubies, Emeralds, and Safire upon user opening the chest box, harvesting probabilities for a user to collect the Rubies, Emeralds, and Safire, may be specified by the provider of the virtual space such that 65% of the 100 gems may be Rubies, 20% of the 100 gems may be Emeralds, and 25% of the 100 gems may be Safire. In some implementations, the provider of the virtual space may specify such probabilities to facilitate a luck system within the virtual space.

In some implementations, the probability module 114 may be configured to determine harvesting probabilities by which denomination and level of virtual currencies may be harvested from a given source core. For facilitating such determinations, the probability module 114 may be configure to employ numerical relationships among the denomination and level of the virtual currencies that may be harvested from the source core, and/or any other parameters for harvesting. For example, in a case where a user character performs harvesting action at a source core that is configured to supply 5 different levels of Rubies used as currencies in the virtual space, numerical relationships among the different levels of Rubies may be obtained by the currency module 110 such that 10 level 1 Rubies=5 level 2 Rubies=3.3 level 3 Rubies=2.5 level 4 Rubies=2 level 5 Rubies. In accordance with such numerical relationships and in response to a harvesting action by a user at the source core, the probability module 114 may determine that there is 10/(10+5+3.3+2.5+2). 43.9% probability that a level 1 Ruby maybe harvested by the user; a 22.0% probability that a level 2 Ruby may be harvested; a 14.5% probability that a level 3 Ruby may be harvested; a 11.0% probability that a level 4 Ruby may be harvested, and a 8.8% probability that a level 5 Ruby may be harvested.

In some implementations, the probability module 114 may be configured to determine the harvesting probability further based on other parameters such as the user skill, equipment used for the harvesting action, a number of user characters employed to harvest, a length of time duration committed for the harvesting action, and/or any other parameters. For example, a probability of harvesting nothing may be determined by the probability module 114 based on the user skills, equipment being used, and/or time duration for the harvesting action committed. For instance, for a user with higher harvesting skills, better equipment and/or having committed more user characters, and time for the harvesting action, a lower probability of nothing will be harvested by the user's harvesting action may be determined. In some implementations, such a probability of null outcome of harvesting may be determined based on the numerical relationships between the denomination and level of the currencies that may be harvested at a given source core. As an illustration, in the example above where a 10:5:3.3:2.5:1 relationship is obtained for 5 different levels of Rubies supplied by a source core, a probability of null outcome may be determined by the probability module 114 in response to a user's harvesting action at the source core based on the user skill, and equipment being used in the user harvesting action such that the numerical relationship becomes 10:5:3.3:2.5:1:3, wherein the ratio 3 indicates the probability that the user harvesting action may not yield anything. Accordingly, the probability that a level 1 Ruby may be harvested by the user becomes 10/(10+5+3.3+2.5+1+3). 38.8%, and there is 11.7% probability that nothing may be harvested by the user.

Harvesting module 116 may be configured to determine denomination and level of virtual currencies to be harvested by users in response to user harvesting actions. Such determinations may be made by the harvesting module 116 by generating one or more of a non-deterministic outcome for the user harvesting actions in accordance with the harvesting probabilities determined by the probability module 114. In some examples wherein the user harvesting actions are durational (e.g., mining or digging a source core for virtual currencies for a period of time), the harvesting module 116 may be configured to determine a length of unit time and/or an amount of outputs which the harvesting probabilities may be applied to. For example, for a given source core, the harvesting module 116 may determine an output rate quantified by a unit of time (e.g., every second, every 3 seconds, every 10 seconds, every 15 seconds, and so on) at which an amount of outputs (e.g., 1 gem, 2 gems, 10 pieces of woods, and so on) may be harvested by a user in response to the user harvesting action at the source core. For instance, for a source core that supplies Rubies, the harvesting module 116 may determine that 5 Rubies/second may be output to a user who has committed harvesting action(s) at the source core. Such an output rate may be made by the harvesting module 116 further based on the user skill, a number of user characters employed in the harvesting action, equipment used in the harvesting action, and/or any other parameters.

As illustration, in an example where a user may direct a user character (e.g. a knight) to harvest Rubies and Emeralds at a source core configured to supply such. In response to the harvesting action performed by the user character, the harvesting module 116 may determine, based on relevant harvesting skills acquired by the user in the virtual space, the equipment being used in the harvesting action, and the experience of the user character that is performing the harvesting action, that an output rate of 4 units of outputs (i.e. a combination of Emeralds, Rubies or nothing) per second to the user. The harvesting module 116 may determine the 4 units of output/second to the user based on the probabilities determined by the probability module 114. For instance, the probability module 114 may determine that for one unit of output (i.e., a Ruby, Emerald or nothing) from that source core, there is a 33% probability that it is a level 1 Ruby, a 25% probability that it is a level 2 Ruby, a 12% probability it is a level 3 Ruby, a 10% probability that it is a level 1 Emerald, a 6% probability that it is a level 2 Emerald, a 4% probability that it is a level 3 Emerald and a 10% probability that nothing may be harvested. To generate non-deterministic outcomes of the harvesting according to the such a scheme, the harvesting module 116 may employ a randomizing function adapted to the probabilities determined by the probability module 114 (e.g. a dice function with multiple sides representing different levels of a Ruby and an Emerald having corresponding likelihoods being rolled on as determined by the probability module 114) such that for the first unit of output in every second a Ruby or Emerald (i.e., a level 1, 2, or 3 Ruby or Emerald) or nothing may be determined in accordance with the probabilities, and the second, third, and fourth unit of output may be determined similarly.

In some example, the user harvesting action may not be durational such as, without limitations, opening a chest box, treasure trove, collecting a tree leave, and/or other non-durational harvesting action. In those examples, the harvesting module 116 may be configured to apply the harvesting probabilities determined by the probability module 114 without determining an output rate. For example, in a case where a user opens a treasure trove having different levels of Rubies, Emeralds, and Safire, the harvesting module 116 may determine the non-deterministic outcome (i.e., a number of a variety of different levels of Rubies, Emeralds, and Safire) may be provided to the user in accordance with the probabilities determined by the probability module 114.

Distribution module 118 may be configured to distribute virtual currencies to user inventories in response to the denomination and level of virtual currencies determined by the harvesting module 116. For such distributions, the distribution module 118 may be configured distribute the virtual currencies harvested by the users to the user inventories at a rate predetermined by the provider, administrator, moderator, and/or any other entities related to the virtual space. For example, in response to a user harvesting action and outcome generated by the harvesting module 116, the distribution module 118 may add the harvested denomination and level of virtual currencies at the rate they are harvested from the source core as determined by the harvesting module 116. In another example, the distribution module 118 may distribute the harvested denomination and level of virtual currencies at the conclusion of the harvesting action committed by the user—e.g., the user opens a chest box and collects 100 gems of different types and levels.

The server 102, client computing platforms 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 120 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 118, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 119 may include sources of information, hosts and/or providers of virtual environments outside of system 100, external entities participating with system 100, and/or other resources. In some implementations, some or all of the functionality attributed herein to external resources 119 may be provided by resources included in system 100.

Server 102 may include electronic storage 122, one or more processors 120, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 122 may comprise non-transitory storage media that electronically stores information. The electronic storage media of electronic storage 122 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 116 may include one or more virtual storage resources (e.g., cloud storage, a virtual private network, and/or other virtual storage resources). Electronic storage 122 may store software algorithms, information determined by processor 120, information received from server 102, information received from client computing platforms 104, and/or other information that enables server 102 to function as described herein.

Processor(s) 120 is configured to provide information processing capabilities in server 102. As such, processor 120 may include one or more of a digital processor, an analog processor, a digital circuit designed to process information, an analog circuit designed to process information, a state machine, and/or other mechanisms for electronically processing information. Although processor 120 is shown in FIG. 1 as a single entity, this is for illustrative purposes only. In some implementations, processor 120 may include a plurality of processing units. These processing units may be physically located within the same device, or processor 120 may represent processing functionality of a plurality of devices operating in coordination. The processor 120 may be configured to execute modules 106, 108, 110, 112, 114, 116, 118 and/or other modules. Processor 120 may be configured to execute modules 106, 108, 110, 112, 114, 116, 118 and/or other modules by software; hardware; firmware; some combination of software, hardware, and/or firmware; and/or other mechanisms for configuring processing capabilities on processor 120. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 106, 108, 110, 112, 114, 116, 118 are illustrated in FIG. 1 as being implemented within a single processing unit, in implementations in which processor 122 includes multiple processing units, one or more of modules 106, 108, 110, 112, 114, 116, 118 may be implemented remotely from the other modules. The description of the functionality provided by the different modules 106, 108, 110, 112, 114, 116, 118 described below is for illustrative purposes, and is not intended to be limiting, as any of modules 106, 108, 110, 112, 114, 116, 118 may provide more or less functionality than is described. For example, one or more of modules 106, 108, 110, 112, 114, 116, 118 may be eliminated, and some or all of its functionality may be provided by other ones of modules 106, 108, 110, 112, 114, 116, 118. As another example, processor 120 may be configured to execute one or more additional modules that may perform some or all of the functionality attributed below to one of modules 106, 108, 110, 112, 114, 116, 118.

It is understood that the above description of system 100 is merely illustrated as one example of a system configured to non-deterministically provide denominated virtual currencies in the virtual space. It should be appreciated that in some examples, a localized system 100 may be configured according to a stand-alone architecture such that the system configured to provide rewards to a user in a virtual space based on user performance of gesture in accordance with the disclosure may be localized. For example, the localized system 100 may comprise a processor the same as or similar to the processor 120, e.g., a CPU, a graphical processing unit (GPU), storage, memory, an I/O subsystem, and/or other components included the localized system 100. In those examples, the CPU may be configured to communicate virtual space state information to the GPU through any suitable wired or wireless communications such as, but not limited to, a point-to-point communication like a data bus included in the localized system 100. The GPU may be configured to determine representational view information for presenting instances of virtual space on one or more displays coupled to or included in the localized system 100. It should also be appreciated in some other examples, multiple localized systems 100 may be connected via any wired or wireless links according to a distributed architecture (e.g., peer to peer networks) such that the localized systems 100 may be configured to operate in concert to achieve all or some of the functions of 106, 108, 110, 112, 114, 116, 118, as described above.

Figure 2:
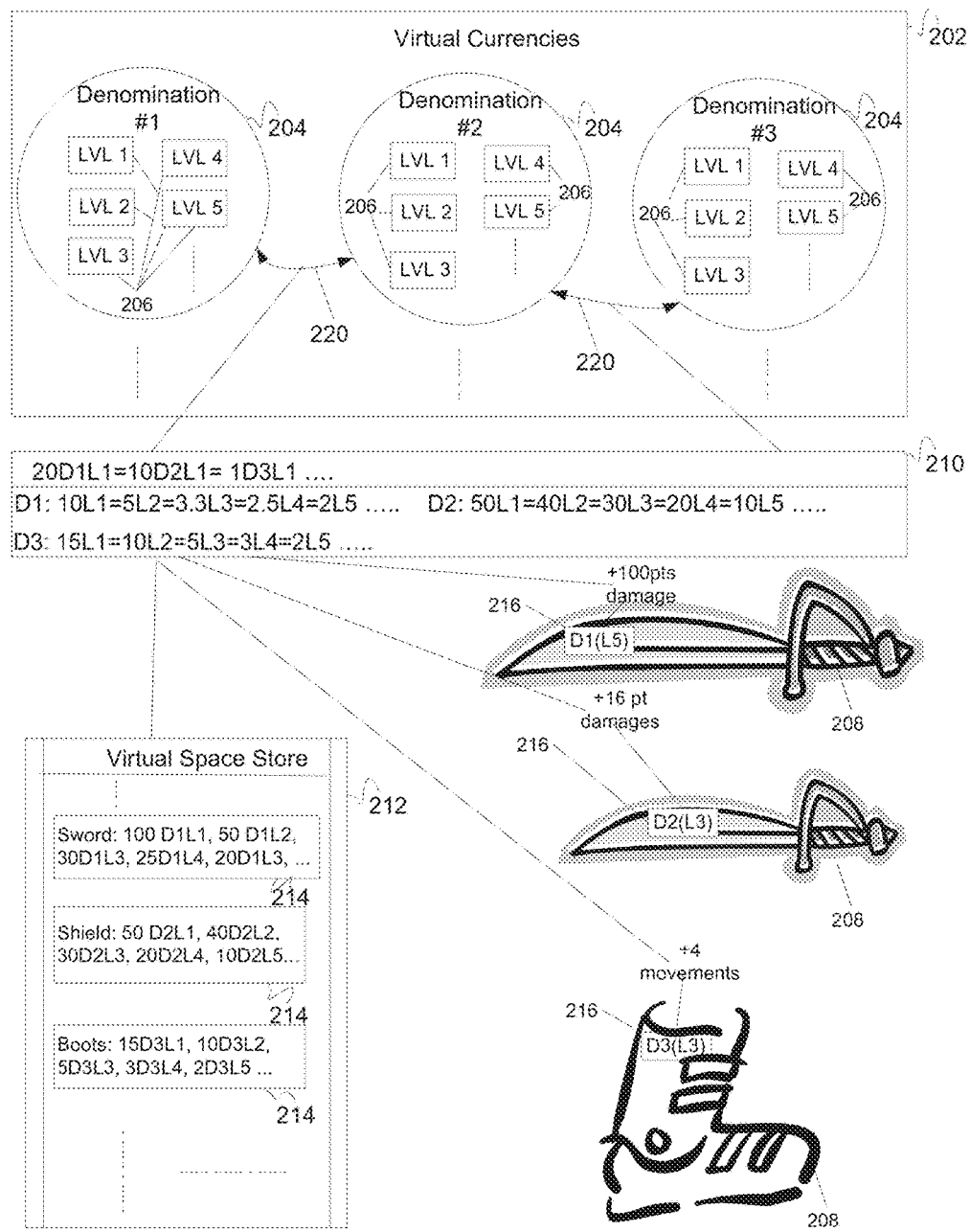
FIG. 2 illustrates an example of using non-deterministically provided denomination and level of virtual currencies in the virtual space.

FIG. 2 illustrates an example of using non-deterministically provided denomination and level of virtual currencies in the virtual space. As shown in this example, units of virtual currencies 202 may be established by denomination systems having different denominations 204. As also shown, within individual denominations 204 of the virtual currencies 202, different levels 206 may be established. Illustrated in this example are three denominations 204 of the virtual currencies 202, each having different levels 206. Numerical relationships among denominations 204 and levels 206 may be specified in the table 210 by, for example, the provider, administrator, moderator, and/or any other entities related to the virtual space. As illustrated in this example the numeric relationship among the denominations 204 and levels 206 of the virtual currencies 202 may specify conversion relations 220 between the denominations 204 and the levels 206 such that the units of virtual currencies 202 may be converted.

As illustrated in this example, units 216 of virtual currencies 202 having different denominations and levels may be used as socketing elements to be socketed on virtual items 208. As shown, the socketed virtual currencies 216 on the virtual items 208 may provide an amount of boost to the base attributes of the virtual item 208. Illustrated in this example is a sword 208 socketed with a denomination #1 and level 5 unit of virtual currency 202, which provides 100 point damage boost to the base damage attribute of the sword 208. As also illustrated in this example is a second sword 208 socketed with a denomination #2 and levels 3 unit of the virtual currency 202, which provides 16 point damage boost to the base damage attribute of the sword 202. Such amount of the boost provided by the units of virtual currencies 202 may be determined, as illustrated, based on the numerical relationships among the denominations 204 and levels 206 as specified in the table 210 (i.e., 1 D1 L5=6 D2L3).

Also shown in this example is a virtual space store 212 operated by the provider of the virtual space. As illustrated, virtual items 214 may be purchased in the virtual space store 212 for an amount of different units of virtual currencies 202. Such prices of virtual items sold in the virtual space store 212 may be determined by the provider of the virtual space based on the numerical relationships among the denominations 204 and levels 206 of the virtual currencies 202 as specified in the table 210. As shown in this example, the sword sold in the virtual space store 212 may be purchased by 100 units of denomination #1 and level 1 of virtual currency 202, 50 units of denomination #2 and level 2 of virtual currency 202, 30 units of denomination #1 and the level 3 of virtual currency 202, 25 units of denomination #1 and level 4 of the virtual currency 202, or the 20 units of a denomination #1 and level 5 of the virtual currency 202 and so on.

Figure 3:
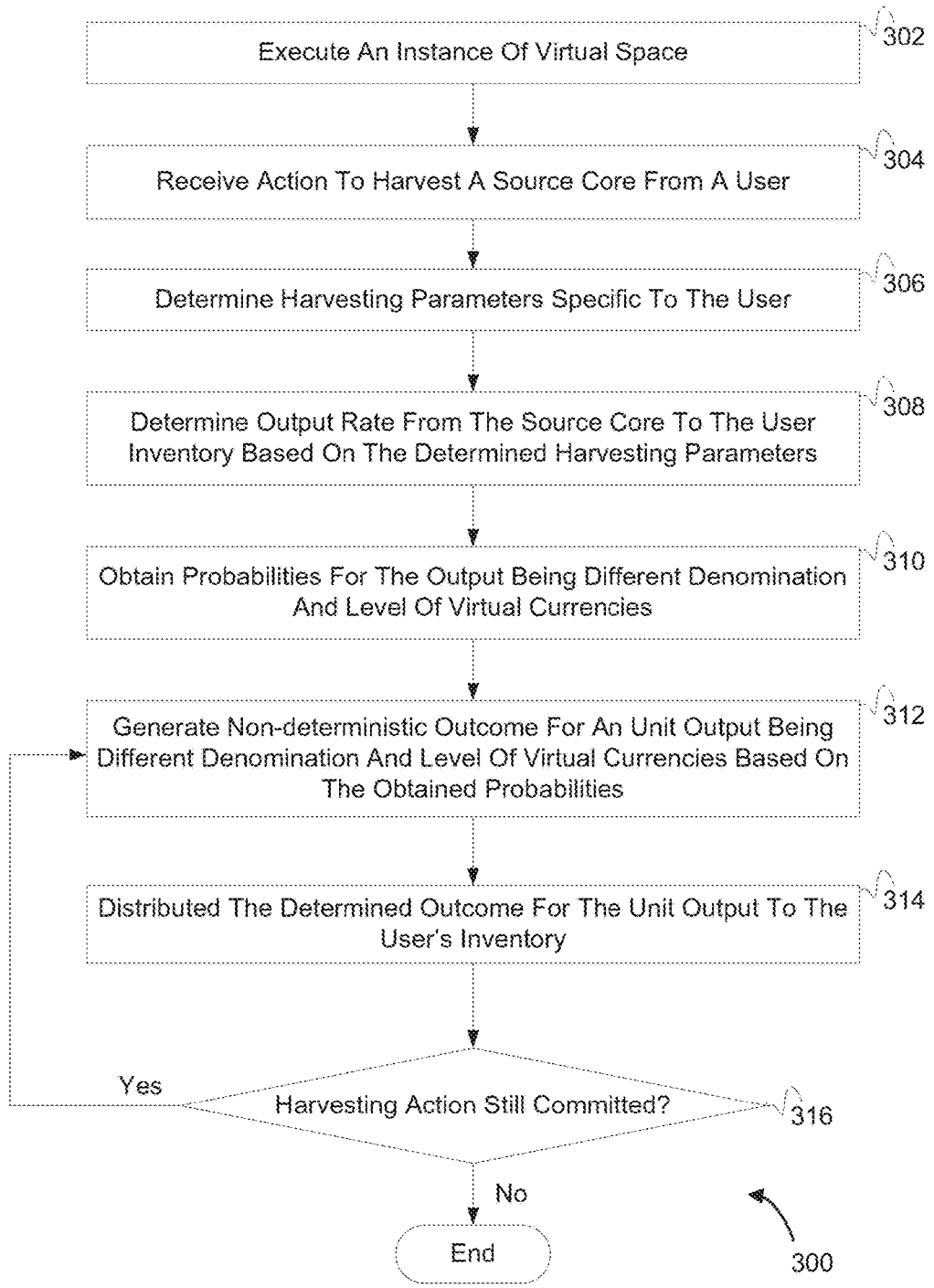
FIG. 3 illustrates an exemplary method for non-deterministically providing denominated virtual currencies in a virtual space.

FIG. 3 illustrates an exemplary method 300 for non-deterministically providing denominated virtual currencies in a virtual space. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At operation 302, an instance of a virtual space may be executed and implemented for user participation in the virtual space. To facilitate such user participation, units of currencies may be provided within the virtual space. The units of the currencies may be different denominations and levels. In some implementations, operation 302 may be performed by a space module the same as or similar to space module 106 (shown in FIG. 1 and described herein).

At operation 304, a harvesting action to harvest a source score may be received from a user. A source core may be a type of virtual space object or location that may provide currencies, raw materials, resources, substances, and/or any other virtual space elements when harvesting actions are performed by user characters with proper skills, equipment, gears, formulas, time duration, and/or any other harvesting parameters. The user may initiate a harvesting action or actions to collect denomination and the level of virtual currencies from the source core. In some implementations, operation 304 may be performed by a harvesting module the same as or similar to harvesting module 118 (shown in FIG. 1 and described herein).

At operation 306, one or more harvesting parameters specific to the user may be determined. The harvesting parameters may include user skill, equipment used for the harvesting action, a number of user characters employed to harvest, a length of time duration committed for the harvesting action, and/or any other harvesting parameters. In some implementations, operation 306 may be performed by a harvesting module the same as or similar to harvesting module 118 (shown in FIG. 1 and described herein).

At operation 308, output rate from the source core to the user inventory may be determined based on the harvesting parameters obtained in the operation 306. The output rate may be determined to quantify an amount of outputs over unit time for a source core to supply the denomination and level of virtual currencies to the users: e.g., two gems of a variety of different levels of Ruby and Emerald every second, three gems a variety of different levels of Ruby, Emerald and Safire every 3 seconds, and so on. In some implementations, operation 308 may be performed by a harvesting module the same as or similar to harvesting module 118 (shown in FIG. 1 and described herein).

At operation 310, harvest probabilities for the output being different denominations and level of virtual currencies may be obtained. Such probabilities may be obtained to facilitate determination of the denomination and level of the virtual currency to be harvested by the user in response to the harvest action received in operation 304. Further details of operation 310 will be described in FIG. 3. In some implementations, operation 310 may be performed by a probability module the same as or similar to probability module 114 (shown in FIG. 1 and described herein).

At operation 312, non-deterministic outcome for a unit output being different denomination the level virtual currencies may be generated based on the probabilities obtaining operation 310. Further details of operation 313 will be described in FIG. 4. In some implementations, operation 312 may be performed by a harvesting module the same as or similar to harvesting module 116 (shown in FIG. 1 and described herein).

At operation 314, the unit output determined in operation 313 may be distributed to the user's inventory. In some implementations, operation 314 may be performed by a distribution module the same as or similar to distribution module 118 (shown in FIG. 1 and described herein).

At decision operation 316, a decision whether the harvesting action received in operation 304 is still committed by the user is made. In cases where it is recognized in operation 316 that the user is still committing the harvesting action, the method 300 proceeds back to operation 312 and repeat operations 312 and 314. In the case where it is recognized that the harvesting action is no longer committed by the user, the method 300 proceeds to the end. In some implementations, operation 313 may be performed by a harvesting module the same as or similar to harvesting module 116 (shown in FIG. 1 and described herein).

Figure 4:
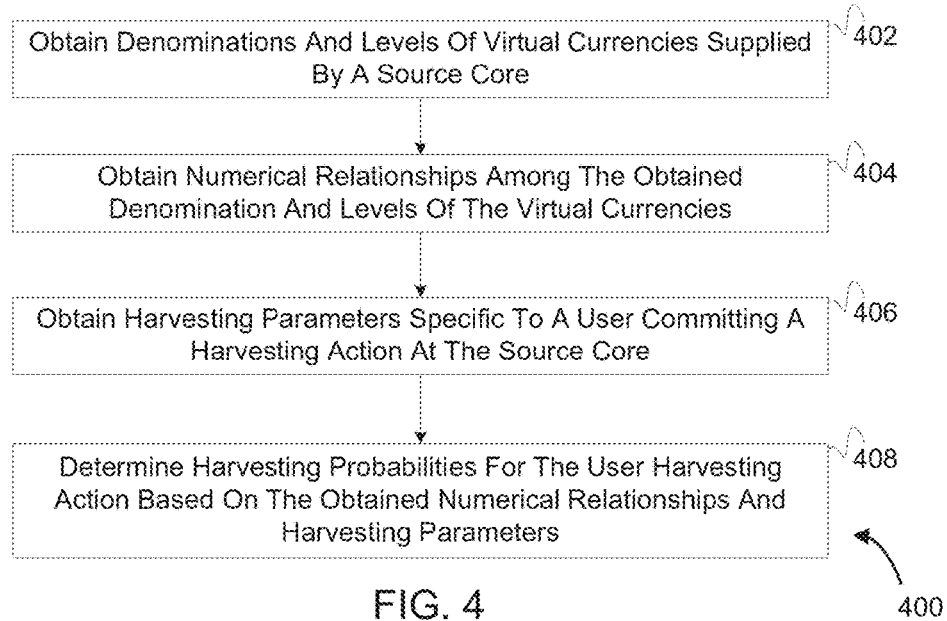
FIG. 4 illustrates an exemplary method for determining probability for harvesting denomination and level of virtual currencies in the virtual space.

FIG. 4 illustrates an exemplary method 400 for determining probability for harvesting denomination and level of virtual currencies in the virtual space. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At operation 402, the denomination and level of virtual currencies supplied by a source core may be obtained. In some implementations, the provider, administrator, moderator, and/or any other entities related to the virtual space may specify a variety of virtual currencies having different denominations and levels and an amount of such virtual currencies may be supplied by a given source core. In some implementations, operation 402 may be performed by a probability module the same as or similar to probability module 114 (shown in FIG. 1 and described herein).

At operation 404, numerical relationships among the denominations and levels of the virtual currencies obtained in the operation 402 may be obtained. The numerical relationships may be specified the provider, administrator, moderator, and/or any other entities related to the virtual space to facilitate conversion among the denomination and level of virtual currencies, e.g. 1 level 1 Emerald=3 level 2 Ruby. In some implementations, operation 404 may be performed by a currency module the same as or similar to currency module 110 (shown in FIG. 1 and described herein).

At operation 406, harvesting parameters specific to a user committing a harvesting action at the source core may be obtained. The harvesting parameters may include user skill, equipment used for the harvesting action, a number of user characters employed to harvest, a length of time duration committed for the harvesting action, and/or any other harvesting parameters. In some implementations, operation 406 may be performed by a probability module the same as or similar to probability module 114 (shown in FIG. 1 and described herein).

At operation 408, the harvesting probability for the user to harvest specific denomination and level of virtual currencies may be determined based on the numerical relationships obtained in the operation 404 and based on the harvesting parameters obtained in the operation 406. In some implementations, operation 408 may be performed by a probability module the same as or similar to probability module 114 (shown in FIG. 1 and described herein).

Figure 5:
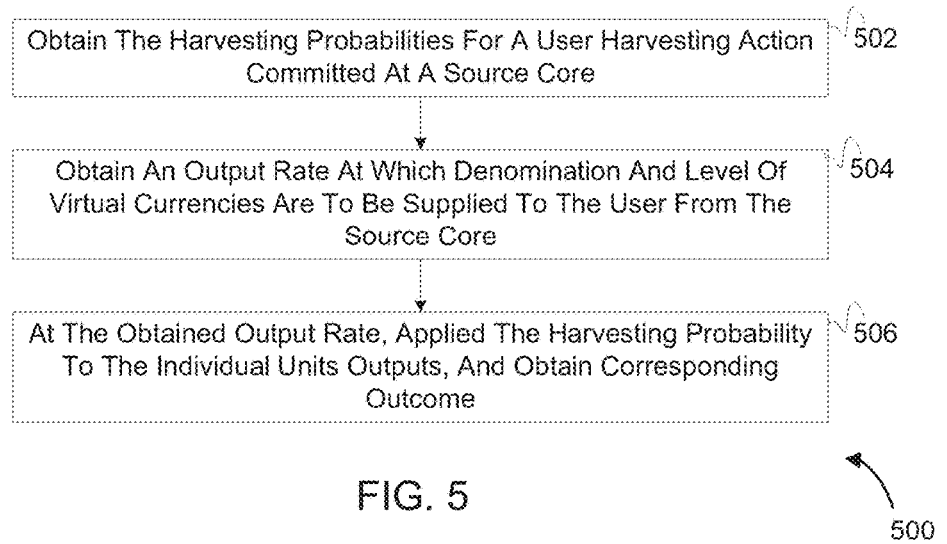
FIG. 5 illustrates an exemplary method for non-deterministically providing different denomination and level of virtual currencies to a user in the virtual space.

FIG. 5 illustrates an exemplary method 500 for non-deterministically providing different denomination and level of virtual currencies to a user in the virtual space. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At operation 502, harvesting probabilities of a user to harvest different denomination and level of virtual currencies may be obtained in response to a harvest action by the user. In some implementations, operation 502 may be performed by a probability module the same as or similar to probability module 115 (shown in FIG. 1 and described herein).

At operation 504, an output rate at which the denomination and level of virtual currencies supplied by the source core may be determined. The output rate may be determined as an amount of outputs over a unit time, e.g., 5 gems/second. In some implementations, operation 504 may be performed by a harvesting module the same as or similar to harvesting module 116 (shown in FIG. 1 and described herein).

At operation 506, individual units of output may be determined by applying the probabilities obtained in operation 502 at the output rate determined in operation 504. In some implementations, operation 504 may be performed by a harvesting module the same as or similar to harvesting module 116 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to non-deterministically provide denominated virtual space elements in a virtual space, the system comprising:
   one or more processors configured by machine-readable instructions to:
      execute an instance of the virtual space and to implement the instance of the virtual space to generate game state information that is transmitted to client computing platforms over a network to facilitate presentation of views of the virtual space to users, wherein the virtual space is configured to facilitate interaction of users with the virtual space such that units of virtual space elements are harvested by users in the virtual space, wherein the units of virtual space elements are usable in the virtual space as consideration to exchange for one or more of virtual items, virtual space actions, and/or virtual space activities, and wherein harvesting the units of virtual space elements includes users performing harvesting actions at one or more source cores that provide the units of virtual space elements in response to commands received over the network from the client computing platforms associated with the users, the units of virtual space elements being different types and different levels such that responsive to the users performing harvesting actions at the one or more source cores, one or more quantities of the units of the virtual space elements having one or more of the different types and one or more of the different levels are distributed to the users;
      manage user accounts comprising information about individual users, the user accounts including a first user account comprising information indicating a first inventory of a first user;
      obtain a first set of probabilities for harvesting types of virtual space elements in the virtual space;
      obtain a second set of probabilities for harvesting levels of virtual space elements in the virtual space;
      receive commands from the client computing platform associated with a first user to perform a harvesting action to harvest one or more virtual space elements from a first source core within the virtual space;
      responsive to the first user performing the harvesting action at the first source core within the virtual space,
         determine a type of the one or more virtual space elements to be harvested by the first user in accordance with the first set of probabilities obtained; and
         determine a level of the one or more virtual space elements to be harvested by the first user in accordance with the second set of probabilities obtained; and
      distribute the virtual space elements to user inventories such that responsive to the type and the level of the one or more virtual space elements to be harvested by the first user being determined and responsive to the first user performing the harvesting action, the determined type and level of the one or more virtual space elements are added to the first user inventory.

2. The system of claim 1, wherein the one or more processors are configured by machine-readable instructions such that one or more of the type and the level of virtual space element to be harvested by the first user are determined non-deterministically in accordance with the probabilities determined.

3. The system of claim 1, wherein the one or more processors are configured by machine-readable instructions to obtain numerical relationships among the types and the levels of the virtual space elements and to obtain utilities for the types and the levels of the virtual space elements.

4. The system of claim 3, wherein the one or more processors are configured by machine-readable instructions such that the obtained utilities of the virtual space elements correspond to crafting, socketing, fighting, defending, learning, exploring, maneuvering, mounting and/or transporting in the virtual space.

5. The system of claim 3, wherein the one or more processors are configured by machine-readable instructions such that obtaining the first probabilities for the harvesting types of the virtual space elements and the second probabilities for the levels of the virtual space elements in the virtual space comprises determining the probabilities based on the numerical relationships among the types and the levels of the virtual space elements obtained.

6. The system of claim 5, wherein the one or more processors are configured by machine-readable instructions such that the determined probabilities include a probability that the harvesting action performed by the first user yields nothing for the first user.

7. The system of claim 1, wherein the one or more processors are further configured by machine-readable instructions such that the virtual space elements are harvested at different harvesting locations within the virtual space, and the probabilities for harvesting the virtual space elements having different types and different levels are determined further based on the harvesting locations.

8. The system of claim 1, wherein the one or more processors are configured by machine-readable instructions to determine an amount of boost to base attributes of virtual items for the types and the levels of virtual space elements socketed on the virtual items.

9. The system of claim 8, wherein the one or more processors are configured by machine-readable instructions such that the boost to the base attributes of the virtual items is determined based on numerical relationships among the types and the levels of the virtual space elements.

10. A method for non-deterministically providing denominated virtual space elements in the virtual space, the method being implemented in one or more physical processors configured by machine-readable instructions, the method comprising:

executing an instance of the virtual space and implementing the instance of the virtual space to generate game state information that is transmitted to client computing platforms over a network to facilitate presentation of views of the virtual space to users, wherein the virtual space is configured to facilitate interaction of users with the virtual space such that units of virtual space elements are harvested by users in the virtual space, wherein the units of virtual space elements are usable in the virtual space as consideration to exchange for one or more of virtual items, virtual space actions, and/or virtual space activities, and wherein harvesting the units of virtual space elements includes users performing harvesting actions at one or more source cores that provide the units of virtual space elements in response to commands received over the network from the client computing platforms associated with the users, the units of virtual space elements being different types and different levels such that responsive to the users performing harvesting actions at the one or more source cores, one or more quantities of the units of the virtual space elements having one or more of the different types and one or more of the different levels are distributed to the users;

managing user accounts comprising information about individual users, the user accounts including a first user account comprising information indicating a first inventory of a first user;

obtaining a first set of probabilities for harvesting types of virtual space elements in the virtual space;

obtaining a second set of probabilities for harvesting levels of virtual space elements in the virtual space;

receiving commands from the client computing platform associated with a first user to perform a harvesting action to harvest one or more virtual space elements from a first source core within the virtual space;

responsive to the first user performing the harvesting action at the first source core within the virtual space, determining a type of one or more virtual space elements to be harvested by the first user in accordance with the first set of probabilities obtained; and determining a level of the one or more virtual space elements to be harvested by the first user in accordance with the second set of probabilities obtained; and distributing the virtual space elements to user inventories such that responsive to the type and the level of the one or more virtual space element to be harvested by the first user being determined and responsive to the first user performing the harvesting action, adding the determined type and level of the one or more virtual space elements to the first user inventory.

11. The method of claim 10, wherein the determination of the type and the level of virtual space element to be harvested by the first user are made non-deterministically in accordance with the determined probabilities.

12. The method of claim 10, further comprising obtaining numerical relationships among the types and the levels of the virtual space elements and obtaining utilities for the types and the levels of the virtual space elements.

13. The method of claim 12, wherein the obtained utilities of the virtual space elements correspond to crafting, socketing, fighting, defending, learning, exploring, maneuvering, mounting and/or transporting in the virtual space.

14. The method of claim 12, wherein obtaining the first probabilities for the harvesting types of the virtual space elements and the second probabilities for the levels of virtual space elements in the virtual space comprises determining the probabilities based on the obtained numerical relationships among the types and the levels of the virtual space elements.

15. The method of claim 14, wherein the determined probabilities include a probability that the harvesting action performed by the first user yields nothing for the first user.

16. The method of claim 10, wherein the virtual space elements are harvested at different harvesting locations within the virtual space, and wherein the probabilities for harvesting the virtual space elements having different types and different levels are determined further based on the harvesting locations.

17. The method of claim 10, further comprising determining an amount of boost to base attributes of virtual items for the types and the levels of virtual space elements socketed on the virtual items.

18. The method of claim 17, wherein the boost to the base attributes of the virtual items is determined based on numerical relationships among the types and the levels of the virtual space elements.

19. The system of claim 1, wherein the virtual space elements are at least one of virtual raw materials, virtual resources, virtual currencies, or virtual substances.

* * * * *